(12) United States Patent
Du et al.

(10) Patent No.: US 10,821,904 B2
(45) Date of Patent: Nov. 3, 2020

(54) VEHICLE AND RUNNING BOARD DEVICE FOR VEHICLE

(71) Applicant: T-MAX (HANGZHOU) TECHNOLOGY CO., LTD., Hangzhou (CN)

(72) Inventors: Xinfa Du, Hangzhou (CN); Xing Fan, Hangzhou (CN)

(73) Assignee: T-MAX (HANGZHOU) TECHNOLOGY CO., LTD., Hanzhou (CN)

( * ) Notice: Subject to any disclaimer, the term of this patent is extended or adjusted under 35 U.S.C. 154(b) by 162 days.

(21) Appl. No.: 15/999,525

(22) PCT Filed: Jul. 7, 2016

(86) PCT No.: PCT/CN2016/089191
§ 371 (c)(1),
(2) Date: Aug. 17, 2018

(87) PCT Pub. No.: WO2017/140081
PCT Pub. Date: Aug. 24, 2017

(65) Prior Publication Data
US 2019/0329711 A1    Oct. 31, 2019

(30) Foreign Application Priority Data

Feb. 18, 2016 (CN) ............................ 2016 1 0091284
Feb. 18, 2016 (CN) ...................... 2016 2 0127048 U

(51) Int. Cl.
*B60R 3/02* (2006.01)
*B60R 3/00* (2006.01)
(Continued)

(52) U.S. Cl.
CPC .............. *B60R 3/02* (2013.01); *B60R 3/002* (2013.01); *B60R 16/005* (2013.01);
(Continued)

(58) Field of Classification Search
CPC .. B60R 3/02; B60R 3/00; B60R 3/002; H01H 36/0033; H01H 36/0013; H01H 36/0006
See application file for complete search history.

(56) References Cited

U.S. PATENT DOCUMENTS 3,517,942 A * 6/1970 Cuffe ....................... B60R 3/02
280/166
5,085,450 A * 2/1992 DeHart, Sr. ............... B60R 3/02
280/166
(Continued)

FOREIGN PATENT DOCUMENTS

CN   102452357 A   5/2012
CN   104859724 A   8/2015
(Continued)

OTHER PUBLICATIONS

Communication dated Oct. 31, 2018 transmitting the Extended European Search Report dated Oct. 24, 2018 for European Patent Application No. 16890121.3.
(Continued)

*Primary Examiner* — Steve Clemmons
(74) *Attorney, Agent, or Firm* — Howard & Howard Attorneys PLLC

(57) ABSTRACT

A vehicle and a running board device for the vehicle are provided. The vehicle includes: a vehicle body; a vehicle door; a running board mounted to the vehicle body and movable between an extended position and a retracted position; an actuator connected to the running board; a magnet mounted to the vehicle door; a magnetic induction element mounted to the vehicle body and that cooperates with the magnet so as to be triggered to generate a door-opening signal and a door-closing signal; a signal transmission line having a first end of the signal transmission line connected with the magnetic induction element; and a controller mounted to the vehicle body and connected with
(Continued)

a second end of the signal transmission line and the actuator, so as to actuate the running board to move between the extended position and the retracted position according to the door-opening signal and the door-closing signal.

9 Claims, 10 Drawing Sheets

(51) Int. Cl.
*B60R 16/00* (2006.01)
*B60R 16/023* (2006.01)
*H01H 36/00* (2006.01)
*B60J 5/04* (2006.01)

(52) U.S. Cl.
CPC ....... *B60R 16/023* (2013.01); *H01H 36/0033* (2013.01); *B60J 5/04* (2013.01); *H01H 2231/026* (2013.01)

(56) References Cited

U.S. PATENT DOCUMENTS

| | | | |
|---|---|---|---|
| 5,547,040 A * | 8/1996 | Hansen | B60R 3/02 182/127 |
| 5,697,626 A | 12/1997 | McDaniel et al. | |
| 6,913,241 B2 * | 7/2005 | Bernarding | F01P 7/167 251/129.12 |
| 6,926,295 B2 * | 8/2005 | Berkebile | B60R 3/002 280/163 |
| 7,163,239 B2 * | 1/2007 | Fisher | E05B 81/14 185/37 |
| 7,318,596 B2 * | 1/2008 | Scheuring, III | B60R 3/002 280/163 |
| 8,373,550 B2 * | 2/2013 | McKee | H02P 29/028 296/146.4 |
| 8,602,431 B1 | 12/2013 | May | |
| 8,833,782 B2 * | 9/2014 | Huotari | B60R 3/02 280/166 |
| 9,205,781 B1 * | 12/2015 | May | B60R 3/02 |
| 10,234,588 B2 * | 3/2019 | Backes | H03K 17/9505 |
| 2007/0159308 A1 * | 7/2007 | Johnston | B60P 3/36 340/425.5 |
| 2012/0098231 A1 | 4/2012 | Huotari et al. | |
| 2012/0139206 A1 * | 6/2012 | May | B60R 3/02 280/166 |
| 2016/0347253 A1 | 12/2016 | Du et al. | |
| 2017/0021781 A1 | 1/2017 | Du et al. | |
| 2017/0036605 A1 | 2/2017 | Du et al. | |
| 2017/0036606 A1 | 2/2017 | Du et al. | |
| 2017/0036607 A1 | 2/2017 | Du et al. | |
| 2017/0036608 A1 | 2/2017 | Du et al. | |

FOREIGN PATENT DOCUMENTS

| | | |
|---|---|---|
| CN | 105128751 A | 12/2015 |
| CN | 204915491 U | 12/2015 |
| CN | 105291834 A | 2/2016 |
| CN | 105730348 A | 7/2016 |

OTHER PUBLICATIONS

International Search Report and Written Opinion of the International Searching Authority for PCT International Application No. PCT/CN2016/089191 dated Oct. 24, 2016.

\* cited by examiner

VEHICLE AND RUNNING BOARD DEVICE FOR VEHICLE

CROSS-REFERENCE TO RELATED APPLICATIONS

The present application is a National Stage of International Patent Application No. PCT/CN2016/089191 filed on Jul. 7, 2016, which claims priority to and all the benefits of Chinese Patent Application No. 201610091284.9 filed on Feb. 18, 2016 and Chinese Patent Application No. 201620127048.3 filed on Feb. 18, 2016, all of which are hereby expressly incorporated herein by reference in their entirety.

BACKGROUND OF THE INVENTION

1. Field of the Invention

The present disclosure relates to a technical field of vehicles, and more particularly to a vehicle and a running board device for the vehicle.

A vehicle-used running board device is mounted to a chassis below a vehicle door, so as to be used for people to get on or off a vehicle. A control circuit of the running board device in the related art is directly integrated in a control system of the vehicle, and in other words, a control signal of the control circuit of the running board device is accessed to a CAN (Controller Area Network) bus of the vehicle.

The present disclosure is made on the basis of understandings of inventors regarding the following problems and facts.

2. Description of the Related Art

In the related art, a control circuit of a running board device is integrated in a vehicle bus. However, considering confidentiality of vehicle technology, many vehicle manufacturers will adopt confidentiality measures in a communication system of the vehicle, to reject an access of a foreign communication signal. Thus, a control signal of the running board device cannot be accessed in the vehicle bus and the running board device cannot be mounted. In addition, if the control circuit of the running board device is integrated in the vehicle bus, the vehicle bus needs to be transformed, which has a high cost and a complicated operation and will affect reliability of the vehicle.

SUMMARY OF THE INVENTION

Embodiments of the present disclosure seek to solve at least one of the problems existing in the related art to at least some extent. Accordingly, an objective of the present disclosure is to provide a vehicle having a running board device that can be controlled separately.

Another objective of the present disclosure is to provide a running board device for a vehicle.

The vehicle of embodiments of a first aspect of the present disclosure includes: a vehicle body; a vehicle door mounted to the vehicle body and movable between an opened position and a closed position; a running board mounted to the vehicle body and movable between an extended position and a retracted position; an actuator connected to the running board so as to actuate the running board to move between the extended position and the retracted position; a magnet mounted to the vehicle door; a magnetic induction element mounted to the vehicle body and that cooperates with the magnet so as to be triggered to generate a door-opening signal and a door-closing signal; a signal transmission line used to transmit the door-opening signal and the door-closing signal, a first end of the signal transmission line being connected with the magnetic induction element; and a controller mounted to the vehicle body and connected with a second end of the signal transmission line and the actuator, so as to actuate the running board to move between the extended position and the retracted position according to the door-opening signal and the door-closing signal.

The vehicle according to some embodiments of the present disclosure has advantages of steady and reliable signal transmission, being easy to control, being convenient for the user to get on or off the vehicle, being easy to use and so on.

In addition, the vehicle according to some embodiments of the present disclosure may further have the following additional technical features.

According to an embodiment of the present disclosure, the magnetic induction element is a reed switch.

According to an embodiment of the present disclosure, the magnet is mounted to a free end of the vehicle door, the magnetic induction element is mounted to a portion of the vehicle body and fitted with the free end of the vehicle door, and the controller is mounted in an engine compartment of the vehicle.

According to an embodiment of the present disclosure, the vehicle further includes a display instrument that displays open and closed states of the vehicle door as well as extended and retracted states of the running board, the display instrument being connected with the controller.

According to an embodiment of the present disclosure, the vehicle door includes a first front vehicle door and a first rear vehicle door mounted to a first side of the vehicle body, and a second front vehicle door and a second rear vehicle door mounted to a second side of the vehicle body; four magnets are provided, four magnetic induction elements are provided, and four signal transmission lines are provided, in which a first magnet is mounted to the first front vehicle door, a second magnet is mounted to the first rear vehicle door, a third magnet is mounted to the second front vehicle door and a fourth magnet is mounted to the second rear vehicle door; the magnetic induction element cooperating with the first magnet is mounted to a first portion of the vehicle body located at the front of the first front vehicle door, the magnetic induction element cooperating with the second magnet is mounted to a second portion of the vehicle body located at the rear of the first rear vehicle door, the magnetic induction element cooperating with the third magnet is mounted to a third portion of the vehicle body located at the front of the second front vehicle door, and the magnetic induction element cooperating with the fourth magnet is mounted to a fourth portion of the vehicle body located at the rear of the second rear vehicle door, in which respective first ends of the four signal transmission lines are connected with the four magnetic induction elements by one to one correspondence and the second end of each signal transmission line is connected with the controller.

According to an embodiment of the present disclosure, the vehicle door includes a first front vehicle door and a first rear vehicle door mounted to a first side of the vehicle body, and a second front vehicle door and a second rear vehicle door mounted to a second side of the vehicle body. Four magnets are provided, four magnetic induction elements are provided, and four signal transmission lines are provided. The first magnet is mounted to a free end of the first front vehicle door. The second magnet is mounted to a free end of the first rear vehicle door. The third magnet is mounted to a free end of the second front vehicle door and the fourth magnet is mounted to a free end of the second rear vehicle door. The magnetic induction element cooperating with the first magnet is mounted to a fifth portion of the vehicle body fitted with the free end of the first front vehicle door. The magnetic induction element cooperating with the second magnet is mounted to a sixth portion of the vehicle body fitted with the free end of the first rear vehicle door. The magnetic induction element cooperating with the third magnet is mounted to a seventh portion of the vehicle body fitted with the free end of the second front vehicle door, and the magnetic induction element cooperating with the fourth magnet is mounted to an eighth portion of the vehicle body fitted with the free end of the second rear vehicle door. The respective first ends of the four signal transmission lines are connected with the four magnetic induction elements by the one to one correspondence and the second end of each signal transmission line is connected with the controller.

According to an embodiment of the present disclosure, the actuator includes a retractable mechanism mounted to the vehicle body and connected with the running board so as to drive the running board to move between the extended position and the retracted position; and an electric motor connected with the controller and the retractable mechanism so as to actuate the retractable mechanism to extend and retract.

According to an embodiment of the present disclosure, the retractable mechanism includes a mounting support, a running board support, and an arm assembly connected between the mounting support and the running board support and drives the running board support to move between the extended position and the retracted position.

According to an embodiment of the present disclosure, the vehicle further includes an elastic member that is elastically deformed to store energy when the electric motor actuates the running board support to move towards the extended position and restored to release the energy when the electric motor actuates the running board support to move towards the retracted position, so as to assist the electric motor to actuate the retractable mechanism.

According to an embodiment of the present disclosure, the elastic member is a spiral spring, a first end of the spiral spring being fixed and a second end of the spiral spring being driven to twist by an electric motor shaft of the electric motor.

According to an embodiment of the present disclosure, the vehicle further includes a connecting dish and a cover cap, in which an electric motor casing of the electric motor is provided with a recess. The recess is covered by the cover cap to define an accommodating space. The connecting dish is disposed in the accommodating space and is driven to rotate by the electric motor shaft of the electric motor. The spiral spring is disposed in the accommodating space. The first end of the spiral spring is fixed in the cover cap and the second end of the spiral spring is connected with the connecting dish.

According to an embodiment of the present disclosure, the cover cap is detachably snapped onto the electric motor casing. The mounting support is provided with a position limiting column. The cover cap is provided with a position limiting notch. The position limiting column is fitted in the position limiting notch, so as to mount the cover cap to the mounting support, and the first end of the spiral spring is fitted over the position limiting column.

According to an embodiment of the present disclosure, an outer circumferential surface of the connecting dish is provided with a slot and the second end of the spiral spring is inserted in and fitted in the slot.

According to an embodiment of the present disclosure, the electric motor casing is provided with a mounting hole. The position limiting column passes through the mounting hole. The position limiting column defines a threaded hole therein, and the electric motor is mounted to the mounting support through a bolt fitted in the threaded hole.

A running board device for a vehicle according to embodiments of a second aspect of the present disclosure includes a running board movable between an extended position and a retracted position. An actuator is connected to the running board so as to actuate the running board to move between the extended position and the retracted position. A magnet and a magnetic induction element cooperates with the magnet so as to be triggered to generate a door-opening signal and a door-closing signal. A signal transmission line is used to transmit the door-opening signal and the door-closing signal. A first end of the signal transmission line is connected with the magnetic induction element. A controller is connected with a second end of the signal transmission line and the actuator, so as to actuate the running board to move between the extended position and the retracted position according to the door-opening signal and the door-closing signal.

The running board device according to some embodiments of the present disclosure has advantages of a steady and reliable signal transmission, easy to control, convenient for the user to get on or off the vehicle, easy to use and so on.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION OF THE INVENTION

Figure 1:
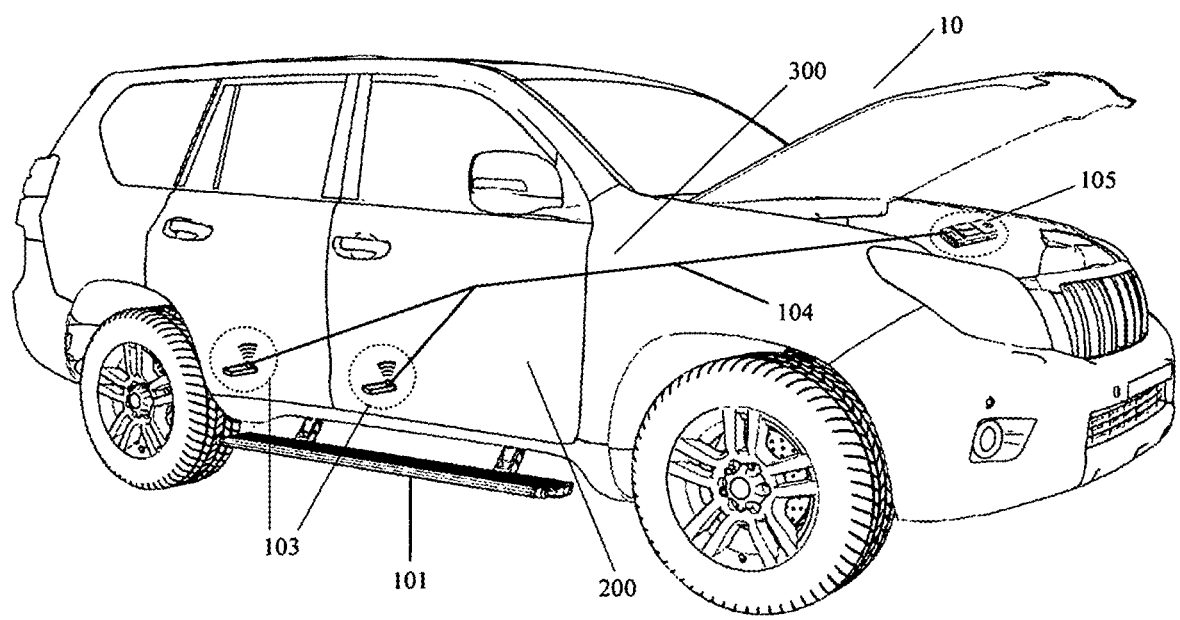
FIG. 1 is a schematic view of a vehicle according to embodiments of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure.

A vehicle 10 according to embodiments of the present disclosure will be described in the following with reference to drawings. As shown in FIGS. 1-6, the vehicle 10 according to embodiments of the present disclosure includes a vehicle body 300, a vehicle door 200 and a running board device 100. The vehicle door 200 is mounted to the vehicle body 300 and movable between an open position and a closed position. The running board device 100 includes a running board 101, an actuator 102, a magnet 106, a magnetic induction element 103, a signal transmission line 104, and a controller 105.

The running board 101 is mounted to the vehicle body 300 and movable between an extended position and a retracted position. The actuator 102 is connected to the running board 101 so as to actuate the running board 101 to move between the extended position and the retracted position. The magnet 106 is mounted to the vehicle door 200, the magnetic induction element 103 is mounted to the vehicle body 300, and the magnetic induction element 103 cooperates with the magnet 106 so as to be triggered to generate a door-opening signal and a door-closing signal.

The signal transmission line 104 is used to transmit the door-opening signal and the door-closing signal, and a first end of the signal transmission line 104 is connected with the magnetic induction element 103. The controller 106 is mounted to the vehicle body 300, and the controller 106 is connected with a second end of the signal transmission line 104 and the actuator 102, so as to actuate the running board 101 to move between the extended position and the retracted position according to the door-opening signal and the door-closing signal.

A working process of the running board device 100 according to embodiments of the present disclosure will be briefly described with reference to FIGS. 1-6.

When a user opens the vehicle door 200, the magnet 106 moves away from the magnetic induction element 103. The magnetic induction element 103 senses that the magnet 106 moves away, and is triggered to generate the door-opening signal. The door-opening signal is transmitted to the controller 106 through the signal transmission line 104. When the controller 106 receives the door-opening signal, the controller 106 controls the actuator to operate. The actuator actuates the running board 101 to move from the retracted position to the extended position, such that the user may tread on the running board 101 to enter the vehicle body 300 or go out of the vehicle body 300, that is, the running board 101 may be treaded on by the user to get on or off the vehicle.

When the user closes the vehicle door 200, the magnet 106 approaches the magnetic induction element 103. The magnetic induction element 103 senses that the magnet 106 approaches, and is triggered to generate the door-closing signal. The door-closing signal is transmitted to the controller 106 through the signal transmission line 104. When the controller 106 receives the door-closing signal, the controller 106 controls the actuator to operate. The actuator actuates the running board 101 to move from the extended position to the retracted position.

For the running board device 100 for the vehicle 10 according to embodiments of the present disclosure, by using the door-opening signal and the door-closing signal generated by triggering the magnetic induction element 103 to control the running board 101 to extend or retract, an automatic extension or retraction of the running board 101 may be achieved, thus making it more convenient for the user to get on or off the vehicle, thereby satisfying requirements of the user better.

For the running board device 100 for the vehicle 10 according to embodiments of the present disclosure, the actuator is controlled by the controller 106 separately, such that it may not increase burdens on a control system of the vehicle 10. Specifically, the running board device 100 does not need to be integrated into the vehicle 10 through a CAN bus, and may be controlled by the controller 106 separately, thereby not increasing the burdens on the control system of the vehicle 10. In addition, the running board device 100 is easy to be controlled and mounted.

Moreover, for the vehicle 10 according to embodiments of the present disclosure, the door-opening signal and the door-closing signal generated by triggering the magnetic induction element 103 may be transmitted to the controller 106 through the signal transmission line 104, such that not only it may prevent the door-opening signal and the door-closing signal from being subject to an outside interference, thereby avoiding causing misoperation or no response, but also no extra battery which may supply power to the magnetic induction element 103 is required, thereby relieving the additional burden from the user that the battery must be replaced regularly. If the door-opening signal and the door-closing signal are transmitted to the controller 106 by a wireless transmission module, an additional battery which may supply power to the wireless transmission module may need to be provided. However, in the present disclosure, the door-opening signal and the door-closing signal are transmitted to the controller 106 by the signal transmission line 104, such that the addition battery is not required.

Accordingly, the running board device 100 according to embodiments of the present disclosure has advantages of steady and reliable signal transmission, being easy to control, being convenient for the user to get on or off the vehicle, being easy to use and so on.

By providing the running board device 100, the vehicle 10 according to some embodiments of the present disclosure has advantages of steady and reliable signal transmission, being easy to control, being convenient for the user to get on or off the vehicle, being easy to use and so on.

As shown in FIGS. 1-6, the vehicle 10 according to some embodiments of the present disclosure includes the vehicle body 300, the vehicle door 200, the running board 101, the actuator 102, the magnet 106, the magnetic induction element 103, the signal transmission line 104 and the controller 106.

In an embodiment of the present disclosure, the magnet 106 is mounted to a free end of the vehicle door 200, and the magnetic induction element 103 is mounted to a portion of the vehicle body 300 that is fitted with the free end of the vehicle door 200, such that a structure of the vehicle 10 may be more reasonable.

Specifically, the vehicle door 200 has a first end and a second end opposite to each other as well as a third end and a fourth end opposite to each other. The first end of the vehicle door 200 is pivotally mounted to the vehicle body 300. The second end, the third end and the fourth end of the vehicle door 200 each are configured as free ends. The portion of the vehicle body 300 is fitted with the free end of the vehicle door 200 refers to a portion of the vehicle body 300 adjacent to the free end of the vehicle door 200 when the vehicle door 200 is closed.

Figure 5:
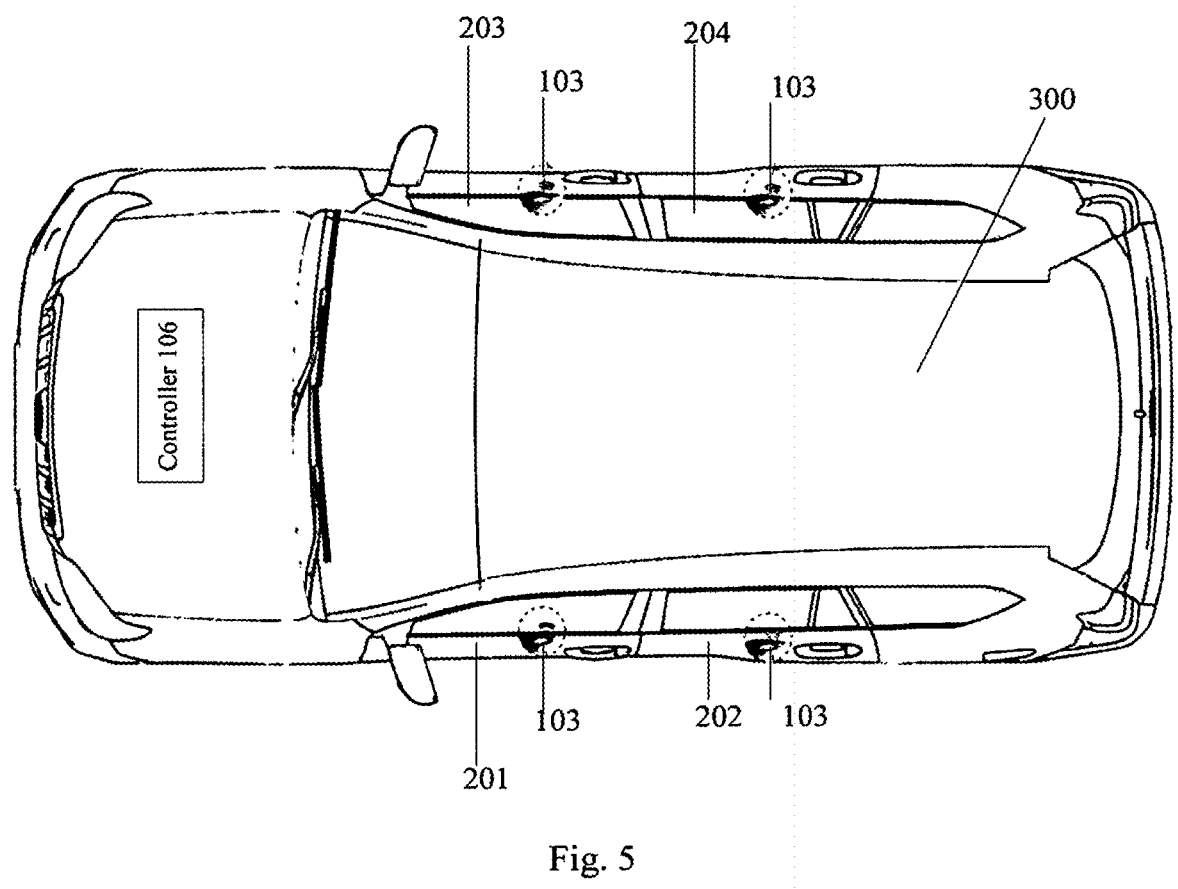
FIG. 5 is a schematic view of a vehicle according to embodiments of the present disclosure.
Figure 6:
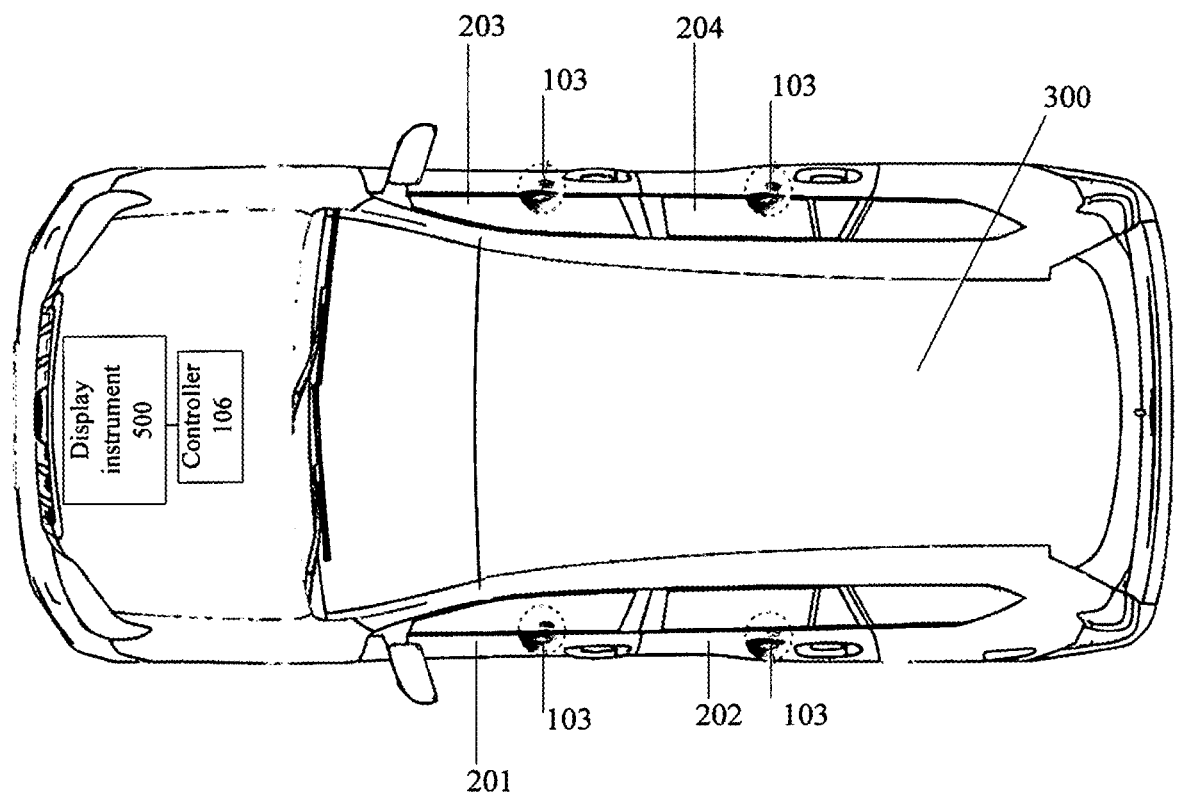
FIG. 6 is a schematic view of a vehicle according to embodiments of the present disclosure.

As shown in FIGS. 5 and 6, the vehicle door 200 includes a first front vehicle door 201, a first rear vehicle door 202, a second front vehicle door 203 and a second rear vehicle door 204. The first front vehicle door 201 and the first rear vehicle door 202 are mounted to a first side of the vehicle body 300 (for example, a left side), and the second front vehicle door 203 and the second rear vehicle door 204 are mounted to a second side of the vehicle body 300 (for example, a right side).

Four magnets 106 may be provided, four magnetic induction elements 103 may be provided, and four signal transmission lines 104 may be provided. A first magnet 106 is mounted to the first front vehicle door 201, a second magnet 106 is mounted to the first rear vehicle door 202, a third magnet 106 is mounted to the second front vehicle door 203 and a fourth magnet 106 may be mounted to the second rear vehicle door 204.

The magnetic induction element 103 cooperating with the first magnet 106 is mounted to a first portion of the vehicle body 300 located at the front of the first front vehicle door 201, the magnetic induction element 103 cooperating with the second magnet 106 is mounted to a second portion of the vehicle body 300 located at the rear of the first rear vehicle door 202, the magnetic induction element 103 cooperating with the third magnet 106 is mounted to a third portion of the vehicle body 300 located at the front of the second front vehicle door 203, and the magnetic induction element 103 cooperating with the fourth magnet 106 is mounted to a fourth portion of the vehicle body 300 located at the rear of the second rear vehicle door 204.

Respective first ends of the four signal transmission lines are connected with the four magnetic induction elements 103 by one to one correspondence and the second end of each signal transmission line 104 is connected with the controller 106, such that signals of open or closed states of the first front vehicle door 201, the first rear vehicle door 202, the second front vehicle door 203 and the second rear vehicle door 204 may be transmitted to the controller 106 by the corresponding signal transmission lines 104 respectively, thus achieving that the signals may be transmitted from multiple points to one point, such that the controller 106 may control a retractable mechanism 1021 correspondingly according to the signal of open or closed state of each door of the vehicle door 200, thereby correspondingly controlling the running board 101 to extend or retract.

That is, two running boards 101 and two actuators 102 may be provided. One running board 101 and the actuator 102 connected with the one running board 101 may be mounted to the first side of the vehicle body 300, and the other running board 101 and the actuator 102 connected with the other running board 101 may be mounted to the second side of the vehicle body 300.

In another embodiment of the present disclosure, the vehicle door 200 includes the first front vehicle door 201, the first rear vehicle door 202, the second front vehicle door 203 and the second rear vehicle door 204. The first front vehicle door 201 and the first rear vehicle door 202 are mounted to the first side of the vehicle body 300 (for example, the left side), and the second front vehicle door 203 and the second rear vehicle door 204 are mounted to the second side of the vehicle body 300 (for example, the right side).

Four magnets 106 may be provided, four magnetic induction elements 103 may be provided, and four signal transmission lines 104 may be provided. The first magnet 106 is mounted to a free end of the first front vehicle door 20E The second magnet 106 is mounted to a free end of the first rear vehicle door 202. The third magnet 106 is mounted to a free end of the second front vehicle door 203 and the fourth magnet 106 may be mounted to a free end of the second rear vehicle door 204.

The magnetic induction element 103 cooperating with the first magnet 106 is mounted to a fifth portion of the vehicle body 300 fitted with the free end of the first front vehicle door 201, the magnetic induction element 103 cooperating with the second magnet 106 is mounted to a sixth portion of the vehicle body 300 fitted with the free end of the first rear vehicle door 202. The magnetic induction element 103 cooperating with the third magnet 106 is mounted to a seventh portion of the vehicle body 300 fitted with the free end of the second front vehicle door 203, and the magnetic induction element 103 cooperating with the fourth magnet 106 is mounted to an eighth portion of the vehicle body 300 fitted with the free end of the second rear vehicle door 204.

The first ends of the four signal transmission lines are connected with the four magnetic induction elements 103 by the one to one correspondence and the second end of each signal transmission line 104 is connected with the controller 106, such that the signals of open or closed states of the first front vehicle door 201, the first rear vehicle door 202, the second front vehicle door 203 and the second rear vehicle door 204 may be transmitted to the controller 106 by the corresponding signal transmission lines 104 respectively, thus achieving that the signals may be transmitted from multiple points to one point, such that the controller 106 may control the retractable mechanism 1021 correspondingly according to the signal of open or closed state of each door of the vehicle door 200, thereby correspondingly controlling the running board 101 to extend or retract.

Figure 3:
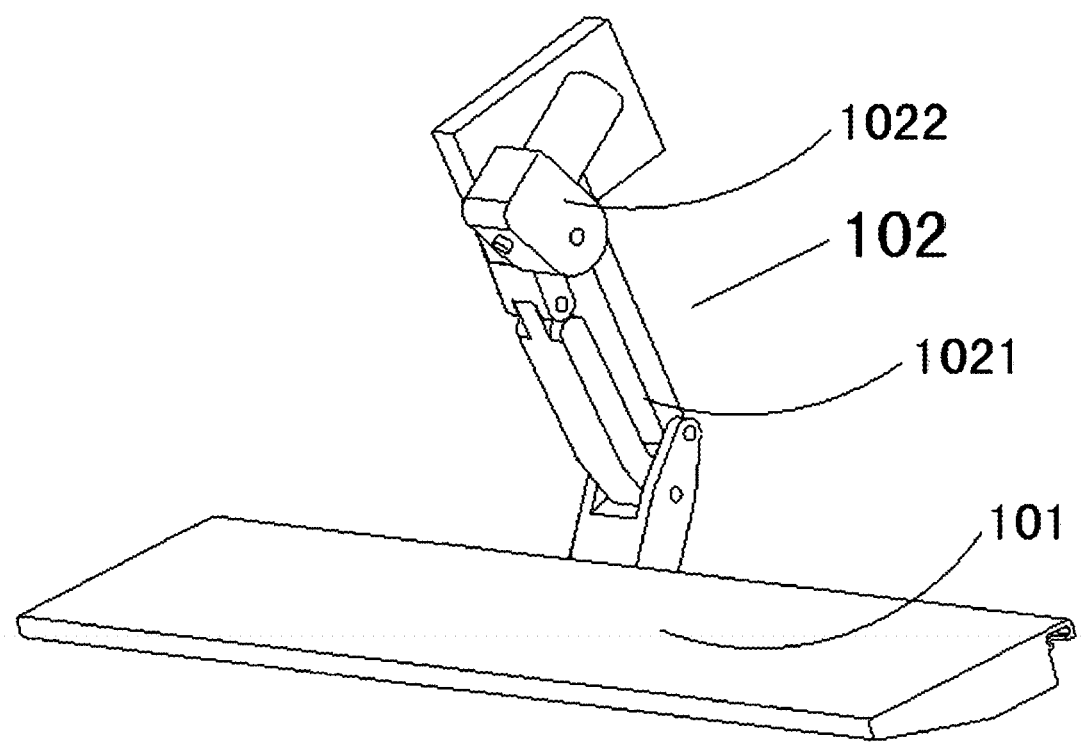
FIG. 3 is a schematic view of a running board of a vehicle according to embodiments of the present disclosure, in which the running board is in an extended position.
Figure 4:
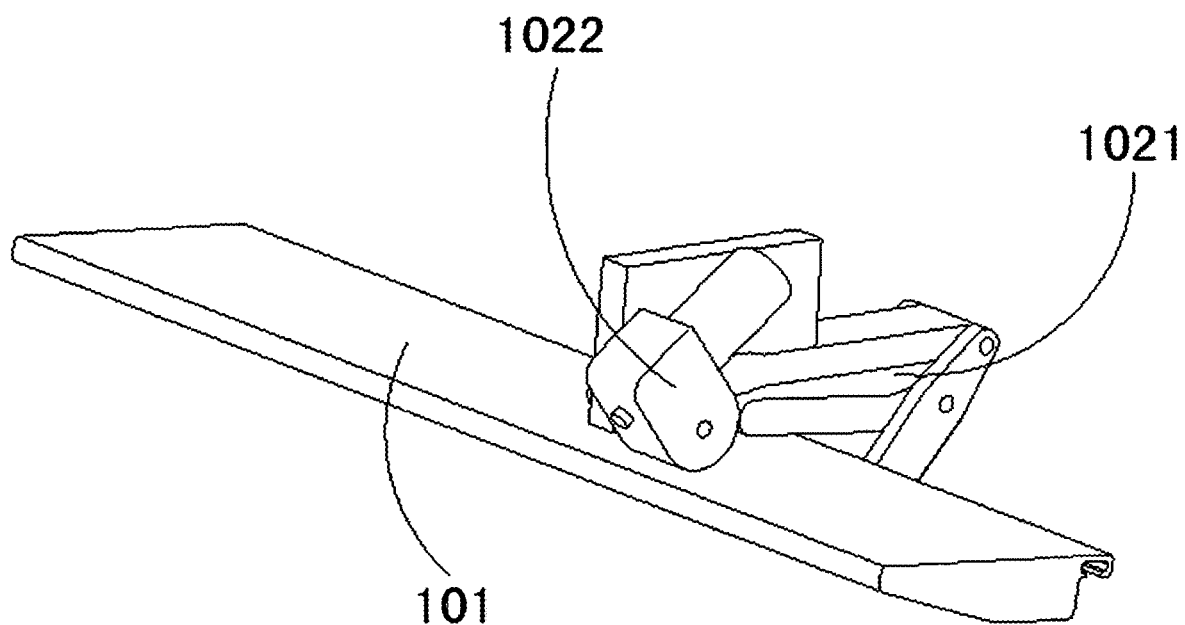
FIG. 4 is a schematic view of a running board of a vehicle according to embodiments of the present disclosure, in which the running board is in a retracted position.

As shown in FIGS. 3 and 4, in an embodiment of the present disclosure, the actuator 102 includes the retractable mechanism 1021 and an electric motor 1022. The retractable mechanism 1021 is mounted to the vehicle body 300. The controller 106 is connected with the electric motor 1022, the electric motor 1022 is connected with the retractable mechanism 1021 so as to actuate the retractable mechanism 1021 to extend and retract. The retractable mechanism 1021 is connected with the running board 101 so as to drive the running board 101 to move between the extended position and the retracted position.

Specifically, when the user opens the vehicle door 200, the controller 106 may control the electric motor 1022 to rotate forwards, such that the electric motor 1022 actuates the retractable mechanism 1021 to extend out and the retractable mechanism 1021 drives the running board 101 to move from the retracted position to the extended position, as shown in FIG. 3. When the user closes the vehicle door 200, the controller 106 may control the electric motor 1022 to rotate reversely, such that the electric motor 1022 actuates the retractable mechanism 1021 to retract and the retractable mechanism 1021 drives the running board 101 to move from the extended position to the retracted position, as shown in FIG. 4.

Figure 2:
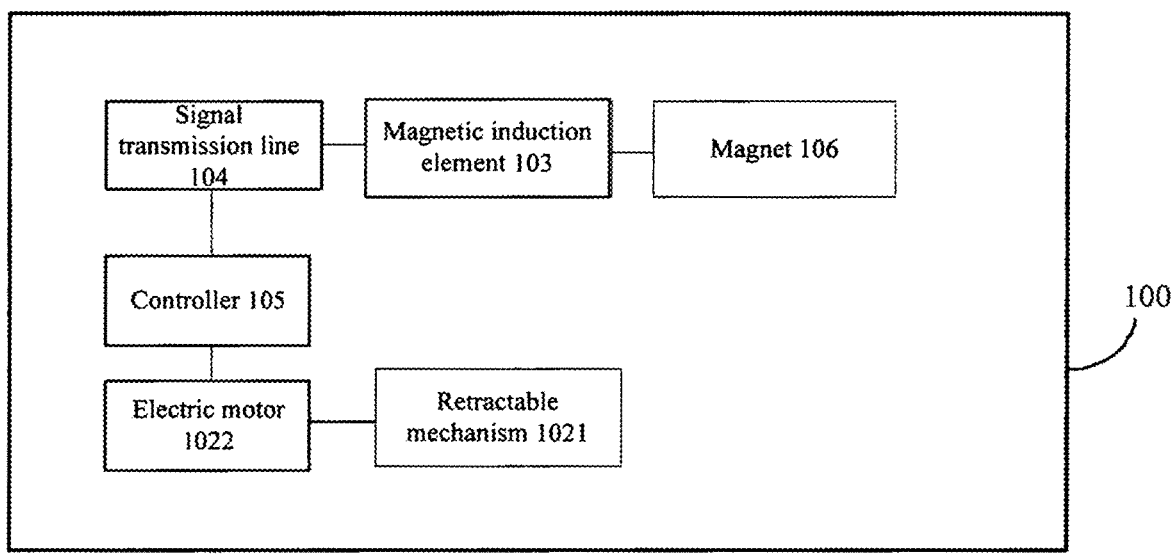
FIG. 2 is a block diagram of a running board device for a vehicle according to embodiments of the present disclosure.

FIG. 2 is a block diagram of the running board device 100 for the vehicle 10 according to embodiments of the present disclosure. As shown in FIG. 2, the running board device 100 for the vehicle 10 according to embodiments of the present disclosure may include the retractable mechanism 1021, the electric motor 1022, the magnet, the magnetic induction element 103, the signal transmission line 104, the controller 106 and the running board 101. Specifically, the magnetic induction element 103 may be a reed switch.

The retractable mechanism 1021 is mounted to the vehicle body 300, and the electric motor 1022 actuates the retractable mechanism 1021 to extend and retract. The magnet 106 cooperates with the magnetic induction element 103, which detects the open and closed states of the vehicle door 200 of the vehicle 10, so as to be triggered to generate the door-opening signal and the door-closing signal.

The first end of the signal transmission line 104 is connected with the magnetic induction element 103, and the second end of the signal transmission line 104 is connected with the controller 106. The signal transmission line 104 transmits the door-opening signal and the door-closing signal. The controller 106 is connected with the second end of the signal transmission line 104 and the electric motor 1022 separately, so as to control the electric motor 1022 to actuate the retractable mechanism 1021 to extend and retract according to the door-opening signal and the door-closing signal transmitted by the signal transmission line 104, such that the retractable mechanism 1021 drives the running board 101 to move between the extended position and the retracted position.

In a specific embodiment of the present disclosure, as shown in FIG. 5, the controller 106 may be mounted in an engine compartment of the vehicle 10.

As shown in FIG. 6, the vehicle 10 according to embodiment of the present disclosure may further include a display instrument 500. The display instrument 500 is connected with the controller 106. The display instrument 500 displays the open and closed states of the vehicle door 200 and extended and retracted states of the running board 101 under the control of the controller 106, such that the user may know extended and retracted situations of the running board 101 more visually, thereby making it convenient for getting on or off the vehicle.

For the running board device 100 for the vehicle 10 according to embodiments of the present disclosure, various functional units may be integrated into one processing module or may exist as separate physically individually, or two or more than two units are integrated into one module. The above integrated module may be implemented by adopting either a form of hardware, or a form of software function module. If the above integrated module is implemented in the form of software function module and is sold or used as an individual product, the above integrated module may also be stored in a computer-readable storage medium.

In some embodiments of the present disclosure, the retractable mechanism 1021 includes a mounting support 10211, a running board support 10212 and an arm assembly 10213. The mounting support 10211 is mounted to the vehicle body 200. For example, the mounting support 10211 is mounted to a chassis of the vehicle body 200. The running board support 10212 is mounted to the running board 101. That is, the running board 101 is mounted to the running board support 10212. The arm assembly 10213 is connected between the mounting support 10211 and the running board support 10212 and drives the running board support 10212 to move between the extended position and the retracted position, so as to drive the running board 101 to move between the extended position and the retracted position.

Advantageously, the retractable mechanism 1021 may be one of a four-bar linkage 1021a, a five-bar linkage 1021b and a six-bar linkage 1022c.

Figure 7:
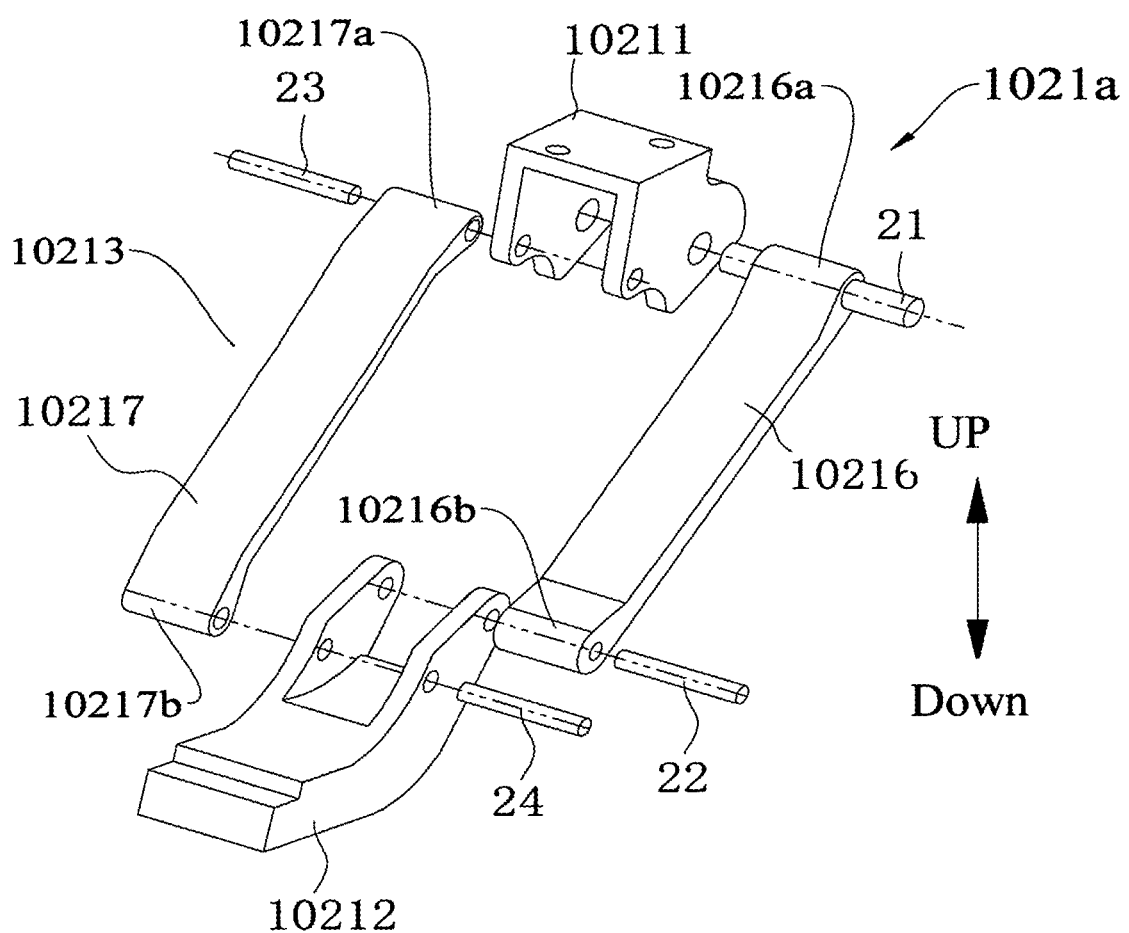
FIG. 7 is a schematic view of a retractable mechanism of a vehicle according to embodiments of the present disclosure, in which the retractable mechanism is shown as a four-bar linkage.

In a specific embodiment shown in FIG. 7, the retractable mechanism 1021 is the four-bar linkage 1021a. The retractable mechanism 10 includes the mounting support 10211, the running board support 10212, and the arm assembly 10213 connected between the mounting support 10211 and the running board support 10212. The arm assembly 10213 includes a first bar arm 10216 and a second bar arm 10217. The first bar arm 10216 has an upper end 10216a and a lower end 10216b. The upper end of the first bar arm 10216 is pivotally connected to the mounting support 10211 through a first connecting pin shaft 21. The lower end of the first bar arm 10216 is pivotally connected to the running board support 10212 through a second connecting pin shaft 22. An upper end of the second bar arm 10217 is pivotally connected to the mounting support 10211 through a third connecting pin shaft 23. A lower end of the second bar arm 10217 is pivotally connected to the running board support 10212 through a fourth connecting pin shaft 24.

At least one of the first bar arm 10216 and the second bar arm 10217 is connected with the electric motor 1022. Accordingly, the electric motor 1022 actuates at least one of the first bar arm 10216 and the second bar arm 10217 to pivot, such that the at least one of the first bar arm 10216 and the second bar arm 10217 drives the running board 101 to extend or retract through the running board support 10212.

Figure 8:
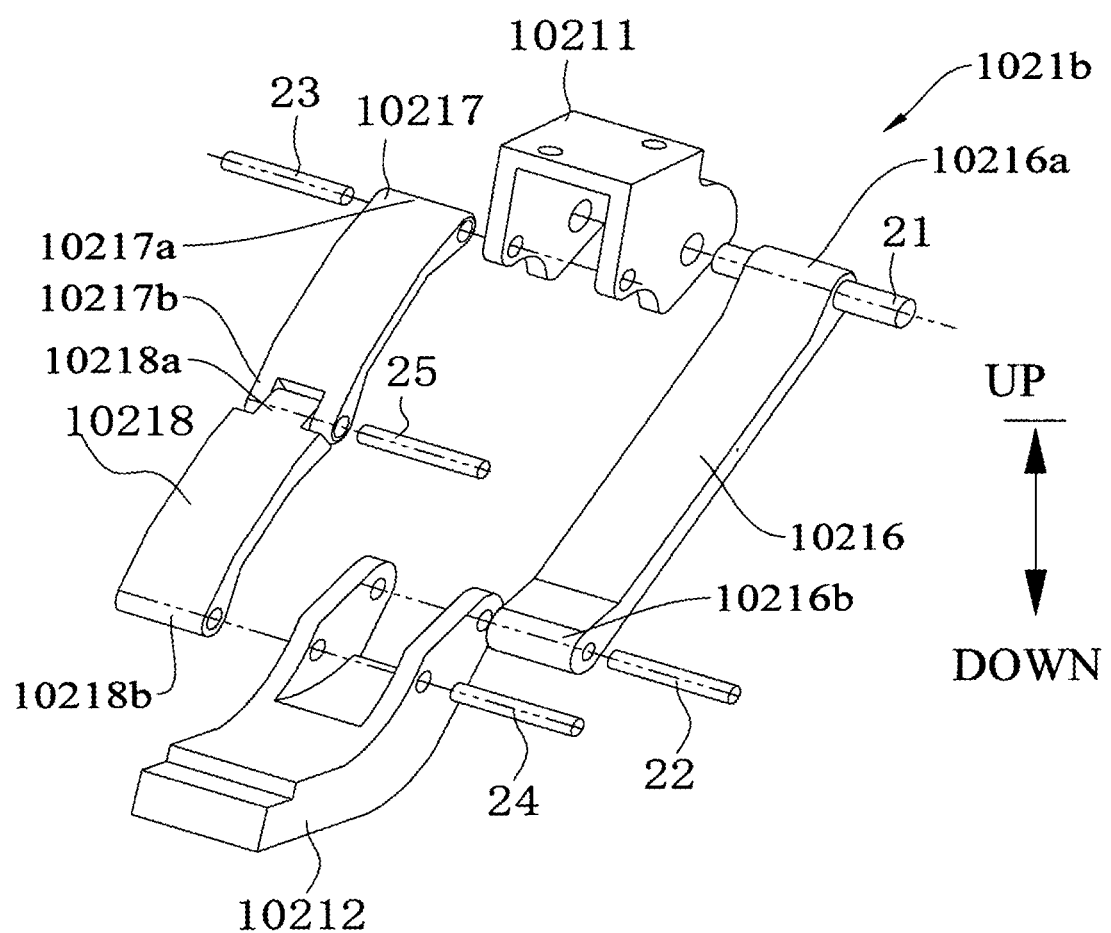
FIG. 8 is a schematic view of a retractable mechanism of a vehicle according to embodiments of the present disclosure, in which the retractable mechanism is shown as a five-bar linkage.

In a specific embodiment shown in FIG. 8, the retractable mechanism 1021 is the five-bar linkage 1021b. The retractable mechanism 1021 includes the mounting support 10211, the running board support 10212, and the arm assembly 10213 connected between the mounting support 10211 and the running board support 10212. More specifically, the arm assembly 10213 includes the first bar arm 10216, the second bar arm 10217 and a third bar arm 10218.

The first bar arm 10216 has the upper end 10216a and the lower end 10216b. The upper end of the first bar arm 10216 is pivotally connected to the mounting support 10211 through the first connecting pin shaft 21. The lower end of the first bar arm 10216 is pivotally connected to the running board support 10212 through the second connecting pin shaft 22.

The second bar arm 10217 has an upper end 10217a and a lower end 10217b, and the upper end 10217a of the second bar arm 10217 is pivotally connected to the mounting support 10211 through the third connecting pin shaft 23. The third bar arm 10218 has an upper end 10218a and a lower end 10218b. The lower end 10217b of the second bar arm 10217 is connected with the upper end 10218a of the third bar arm 10218 through a fifth connecting pin shaft 25. The lower end 10218b of the third bar arm 10218 is pivotally connected to the running board support 10212 through the fourth connecting pin shaft 24.

At least one of the first bar arm 10216 and the second bar arm 10217 is connected with the electric motor 1022. Accordingly, the electric motor 1022 actuates the at least one of the first bar arm 10216 and the second bar arm 10217 to pivot, such that the at least one of the first bar arm 10216 and the second bar arm 10217 drives the running board 101 to extend or retract through the running board support 10212.

Figure 9:
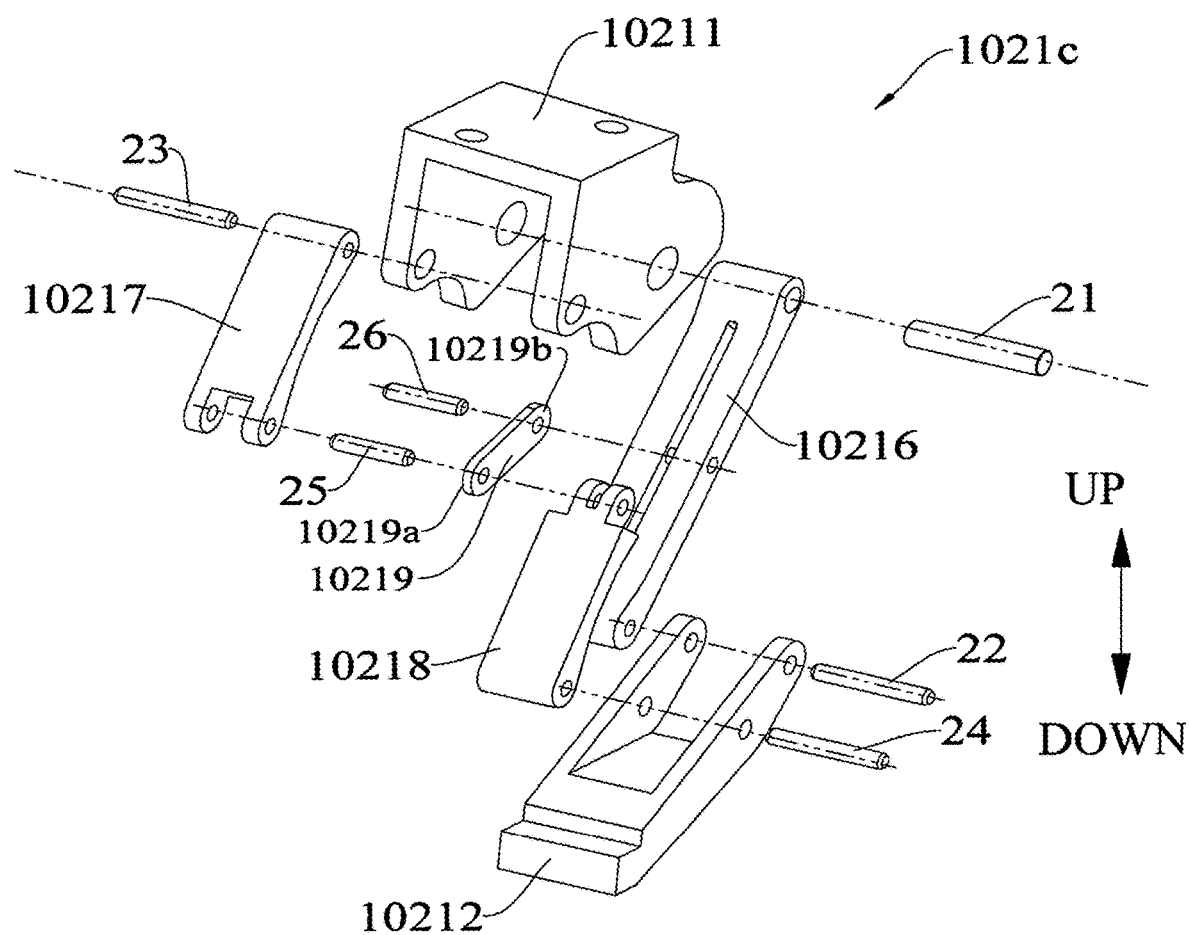
FIG. 9 is a schematic view of a retractable mechanism of a vehicle according to embodiments of the present disclosure, in which the retractable mechanism is shown as a six-bar linkage.

In a specific embodiment shown in FIG. 9, the retractable mechanism 1021 is the six-bar linkage 1021c. The retractable mechanism 1021 includes the mounting support 10211, the running board support 10212, and the arm assembly 10213 connected between the mounting support 10211 and the running board support 10212. The arm assembly 10213 includes the first bar arm 10216, the second bar arm 10217, the third bar arm 10218 and a fourth bar arm 10219.

The first bar arm 10216 has the upper end 10216*a* and the lower end 10216*b*. The upper end 10216*a* of the first bar arm 10216 is pivotally connected to the mounting support 10211 through the first connecting pin shaft 21. The lower end 10216*b* of the first bar arm 10216 is pivotally connected to the running board support 10212 through the second connecting pin shaft 22. The second bar arm 10217 has the upper end 10217*a* and the lower end 10217*b*. The upper end 10217*a* of the second bar arm 10217 is pivotally connected to the mounting support 10211 through the third connecting pin shaft 23.

The third bar arm 10218 has the upper end 10218*a* and the lower end 10218*b*. The lower end 10218*b* of the third bar arm 10218 is pivotally connected to the running board support 10212 through the fourth connecting pin shaft 24. The fourth bar arm 10219 has a first end 10219*a* and a second end 10219*b*. The first end 10219*a* of the fourth bar arm 10219 is connected with the lower end 10217*b* of the second bar arm 10217 and the upper end 10218*a* of the third bar arm 10218 through the fifth connecting pin shaft 25. The second end 10219*b* of the fourth bar arm 10219 is pivotally connected to a middle portion of the first bar arm 10216 through a sixth connecting pin shaft 26.

At least one of the first bar arm 10216 and the second bar arm 10217 is connected with the electric motor 1022. Accordingly, the electric motor 1022 actuates the at least one of the first bar arm 10216 and the second bar arm 10217 to pivot, such that the at least one of the first bar arm 10216 and the second bar arm 10217 drives the running board 101 to extend or retract through the running board support 10212.

Figure 10:
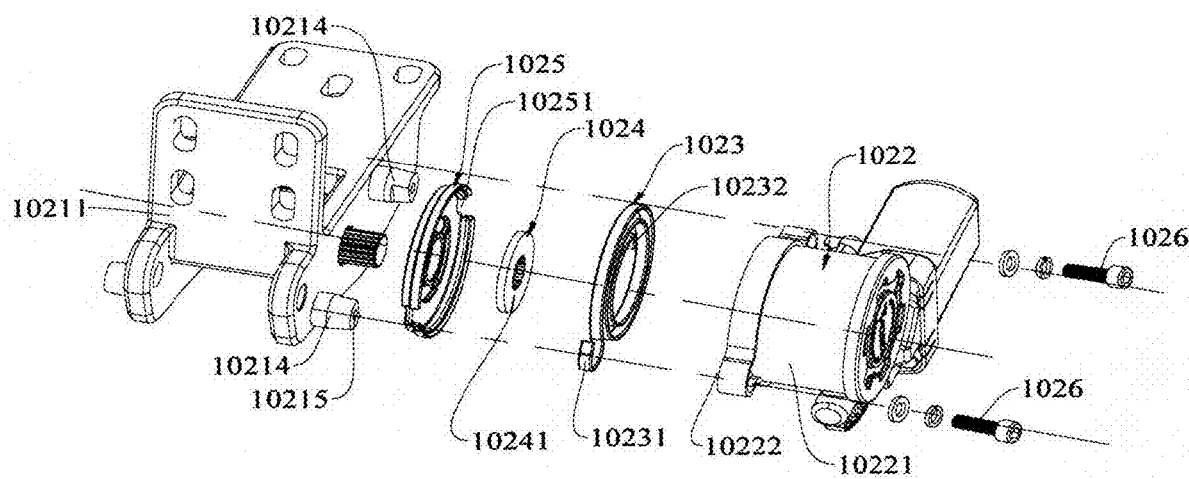
FIG. 10 is a partially exploded view of a vehicle according to embodiments of the present disclosure.

In some embodiments of the present disclosure, as shown in FIG. 10, the vehicle-used running board device 100 further includes an elastic member 1023. The elastic member 1023 is elastically deformed to store energy when the electric motor 1022 actuates the running board support 10212 to move towards the extended position, and is restored to release the energy when the electric motor 1022 actuates the running board support 10212 to move towards the retracted position, so as to assist the electric motor 1022 to actuate the retractable mechanism 1021.

That is, when the running board 101 moves from the retracted position to the extended position, the elastic member 1023 is elastically deformed. When the running board 101 moves from the extended position to the retracted position, the elastic member 1023 releases the energy.

It could be understood that, in a retracting process of the running board 101, a load of the electric motor 1022 is relatively large, and in an extending process of the running board 101, the load of the electric motor 1022 is relatively small, such that a working current in the electric motor 1022 when the running board 101 is retracting is larger than the working current in the electric motor 1022 when the running board 101 is extending.

Specifically, when an electric motor shaft of the electric motor 1022 rotates along a clockwise direction, the electric motor shaft of the electric motor 1022 drives the elastic member 1023 to move, thereby making the elastic member 1023 elastically deformed to store the energy, and the running board 101 moves from the retracted position to the extended position.

When the electric motor shaft of the electric motor 1022 rotates along a counterclockwise direction, the elastic member 1023 is restored to release the energy, so as to assist the electric motor 1022 to actuate the retractable mechanism 1021 to retract, which reduces the load and the working current of the electric motor 1022 when the electric motor rotates along the counterclockwise direction, such that the working current of the electric motor 1022 during the extending process and the retracting process of the retractable mechanism 1021 is generally uniform, thereby effectively protecting the electric motor 1022 and improving the service life of the electric motor 1022.

Advantageously, the elastic member 1023 is a spiral spring. The spiral spring has a first end 10231 and a second end 10232. The first end 10231 of the spiral spring is fixed and the second end 10232 of the spiral spring is driven to twist by the electric motor shaft of the electric motor 1022.

As shown in FIG. 10, an end of an outermost ring of the spiral spring bends outwards to form the first end 10231, and an end of an innermost ring of the spiral spring bends inwards to form the second end 10232. The first end 10231 includes the end of the innermost ring of the spiral spring and part of an inner ring of the spiral spring connected with the end, and the second end 10232 includes the end of the outermost ring of the spiral spring and part of an outer ring connected with the end.

When the retractable mechanism 1021 (i.e., the running board 101) extends, the first end 10231 of the spiral spring is fixed, the second end 10232 of the spiral spring rotates along with the electric motor shaft of the electric motor 1022 and is twisted tightly to store the energy. When the retractable mechanism 1021 (i.e., the running board 101) retracts, the first end 10231 of the spiral spring is fixed, the second end 10232 of the spiral spring rotates along with the electric motor shaft of the electric motor 1022 to be restored to release the energy, thereby providing assistance for the retraction of the retractable mechanism 1021. In addition, by adopting the spiral spring, the elastic member 1023 has a simple and compact structure, and is easy to mount.

However, the present disclosure is not limited to this, and the elastic member 40 may also be configured as an elastic sheet, a disc spring or other parts or components able to be deformed elastically.

As shown in FIG. 10, in a preferred embodiment, the vehicle-used running board device 100 further includes a connecting dish 1024 and a cover cap 1025. An electric motor casing 10221 of the electric motor 1022 is provided with a first recess, and the first recess is covered by the cover cap 1025 to define an accommodating space. The connecting dish 1024 is disposed in the accommodating space and is driven to rotate by the electric motor shaft of the electric motor 1022. The spiral spring is disposed in the accommodating space. The first end 10231 of the spiral spring is fixed in the cover cap 1025 and the second end 10232 of the spiral spring is connected with the connecting dish 1024.

Specifically, the connecting dish 1024 is generally disc-shaped. The connecting dish 1024 is disposed in the accommodating space and two ends of the connecting dish 1024 are opposite to the first recess and the cover cap 1025 correspondingly. The connecting dish 1024 is directly or indirectly connected with the electric motor shaft of the electric motor 1022 so as to be driven to rotate by the electric motor shaft of the electric motor 1022. For example, the connecting dish 1024 is coupled to the electric motor shaft of the electric motor 1022 through a spline.

The spiral spring is fitted over the connecting dish 1024, and the second end 10232 of the spiral spring is connected to the connecting dish 1024 and rotates in the same direction with the connecting dish 1024. Thus, the spiral spring is integrated to the electric motor 1022, thereby not only reducing transmission loss, but also making an overall structure of the vehicle-used running board device 100 more compact.

Advantageously, the cover cap 1025 is detachably snapped onto the electric motor casing 10221. The mounting support 10211 is provided with a position limiting column 10214. The cover cap 1025 is provided with a position limiting notch 10251. The position limiting column 10214 is fitted in the position limiting notch 10251, so as to mount the cover cap 1025 to the mounting support 10211. The first end 10231 of the spiral spring is fitted over the position limiting column 10214.

The first recess is provided to a side of the electric motor casing 10221 facing the mounting support 10211. The cover cap 1025 includes an end cap and a flange connected with an edge of the end cap. An inner wall of the flange is provided with a terraced locating surface. The cover cap 1025 covers the first recess through the terraced locating surface. The position limiting notch 10251 extends inwards from the edge of the cover cap 1025. A side of the mounting support 10211 opposite to the electric motor 1022 is provided with the position limiting column 10214. The position limiting column 10214 is provided with a mount fitted with the position limiting notch 10251. Bottom surfaces of the mounts of the two position limiting columns 10214 keep the cover cap 1025 against the electric motor casing 10221 so as to exert an axial limit to the cover cap 1025, and lateral sides of the mounts of the two position limiting columns 10214 exert a radial limit and a circumferential limit to the cover cap 1025. The second end 10232 of the spiral spring extends out through the position limiting notch 10251 and is fitted over the position limiting column 10214.

Thus, the cover cap 1025, the electric motor casing 10221 and the mounting support 10211 are fixed together, thereby providing a suitable position for fixing the second end 10232 of the spiral spring, reducing distortion of the spiral spring during the installation and the use.

Shapes of the connecting dish 1024, the cover cap 1025 and the first recess may be configured to be round, oval or the like. The number of the position limiting notches 10251 and the position limiting columns 10214 is not limited to two. When the number of the position limiting notches 10251 is more than two, the position limiting notches 10251 may be uniformly arranged along a circumferential direction of the cover cap 1025. More than two position limiting columns 10214 may be provided.

As shown in FIG. 10, an outer circumferential surface of the connecting dish 1024 is provided with a slot 10241 and the second end 10232 of the spiral spring is inserted in and fitted in the slot 10241.

Specifically, referring to FIG. 10, the slot 10241 extends inwards from an outer edge of the connecting dish 1024 and the slot 10241 extends along a radial direction of the connecting dish 1024.

According to an embodiment of the present disclosure, the electric motor casing 10221 is provided with a mounting hole 10222, the position limiting column 10214 passes through the mounting hole 10222. The position limiting column 10214 defines a threaded hole 10215 therein. The electric motor 1022 is mounted to the mounting support 10211 through a bolt 1026 fitted in the threaded hole 10215.

The position limiting column 10214 passes through the position limiting notch 10251 and abuts against the electric motor casing 10221. The mounting hole 10222 in the electric motor casing 10221 is corresponding to the threaded hole 10215 in the position limiting column 10214 by one to one. The bolt 1026 passes through the mounting hole 10222 and is screwed into the threaded hole 10215 so as to mount the electric motor casing 10221 to the mounting support 10211. The electric motor 1022, the connecting dish 1024 and the mounting support 10211 are fixed together by a connection manner of the bolt 1026, thereby facilitating maintenance and replacement of the spiral spring.

However, the present disclosure is not limited to this, the electric motor casing 10221, the connecting dish 1024 and the mounting support 10211 may be fixed by any other appropriate manners such as by welding.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A vehicle comprising:
a vehicle body;
a vehicle door mounted to the vehicle body and movable between an open position and a closed position;
a running board mounted to the vehicle body and movable between an extended position and a retracted position;
an actuator connected to the running board so as to actuate the running board to move between the extended position and the retracted position;
a magnet mounted to the vehicle door;
a magnetic induction element mounted to the vehicle body and that cooperates with the magnet so as to be triggered to generate a door-opening signal and a door-closing signal;
a signal transmission line used to transmit the door-opening signal and the door-closing signal, a first end of the signal transmission line being connected with the magnetic induction element; and
a controller mounted to the vehicle body and connected with a second end of the signal transmission line and the actuator, so as to actuate the running board to move between the extended position and the retracted position according to the door-opening signal and the door-closing signal,
wherein the actuator comprises:
a retractable mechanism mounted to the vehicle body and connected with the running board so as to drive the running board to move between the extended position and the retracted position; and
an electric motor connected with the controller and the retractable mechanism so as to actuate the retractable mechanism to extend and retract,
wherein the retractable mechanism comprises a mounting support, a running board support, and an arm assembly connected between the mounting support and the running board support and that drives the running board support to move between the extended position and the retracted position,
wherein the vehicle further comprises an elastic member that is elastically deformed to store energy when the electric motor actuates the running board support to move towards the extended position and restored to release the energy when the electric motor actuates the running board support to move towards the retracted position, so as to assist the electric motor to actuate the retractable mechanism,
wherein the elastic member is a spiral spring, a first end of the spiral spring being fixed and a second end of the spiral spring being driven to twist by an electric motor shaft of the electric motor,
wherein the vehicle further comprises a connecting dish and a cover cap, wherein an electric motor casing of the electric motor is provided with a recess, the recess is covered by the cover cap to define an accommodating space, the connecting dish is disposed in the accommodating space and is driven to rotate by the electric motor shaft of the electric motor, the spiral spring is disposed in the accommodating space, the first end of the spiral spring is fixed in the cover cap and the second end of the spiral spring is connected with the connecting dish.

2. The vehicle as set forth in claim 1, wherein the magnetic induction element is a reed switch.

3. The vehicle as set forth in claim 1, wherein the magnet is mounted to a free end of the vehicle door, the magnetic induction element is mounted to a portion of the vehicle body fitted with the free end of the vehicle door, and the controller is mounted in an engine compartment of the vehicle.

4. The vehicle as set forth in claim 1, further comprising a display instrument that displays open and closed states of the vehicle door as well as extended and retracted states of the running board, the display instrument being connected with the controller.

5. The vehicle as set forth in claim 1, wherein the vehicle door comprises a first front vehicle door and a first rear vehicle door mounted to a first side of the vehicle body, and a second front vehicle door and a second rear vehicle door mounted to a second side of the vehicle body, four magnets are provided, four magnetic induction elements are provided, and four signal transmission lines are provided, wherein a first magnet is mounted to the first front vehicle door, a second magnet is mounted to the first rear vehicle door, a third magnet is mounted to the second front vehicle door and a fourth magnet is mounted to the second rear vehicle door, the magnetic induction element cooperating with the first magnet is mounted to a first portion of the vehicle body located at the front of the first front vehicle door, the magnetic induction element cooperating with the second magnet is mounted to a second portion of the vehicle body located at the rear of the first rear vehicle door, the magnetic induction element cooperating with the third magnet is mounted to a third portion of the vehicle body located at the front of the second front vehicle door, and the magnetic induction element cooperating with the fourth magnet is mounted to a fourth portion of the vehicle body located at the rear of the second rear vehicle door, wherein respective first ends of the four signal transmission lines are connected with the four magnetic induction elements by one to one correspondence and the second end of each signal transmission line is connected with the controller.

6. The vehicle as set forth in claim 1, wherein the vehicle door comprises a first front vehicle door and a first rear vehicle door mounted to a first side of the vehicle body, and a second front vehicle door and a second rear vehicle door mounted to a second side of the vehicle body, four magnets are provided, four magnetic induction elements are provided, and four signal transmission lines are provided, wherein a first magnet is mounted to a free end of the first front vehicle door, a second magnet is mounted to a free end of the first rear vehicle door, a third magnet is mounted to a free end of the second front vehicle door and a fourth magnet is mounted to a free end of the second rear vehicle door, the magnetic induction element cooperating with the first magnet is mounted to a fifth portion of the vehicle body fitted with the free end of the first front vehicle door, the magnetic induction element cooperating with the second magnet is mounted to a sixth portion of the vehicle body fitted with the free end of the first rear vehicle door, the magnetic induction element cooperating with the third magnet is mounted to a seventh portion of the vehicle body fitted with the free end of the second front vehicle door, and the magnetic induction element cooperating with the fourth magnet is mounted to an eighth portion of the vehicle body fitted with the free end of the second rear vehicle door, wherein respective first ends of the four signal transmission lines are connected with the four magnetic induction elements by the one to one correspondence and the second end of each signal transmission line is connected with the controller.

7. The vehicle as set forth in claim 1, wherein the cover cap is detachably snapped onto the electric motor casing, the mounting support is provided with a position limiting column, the cover cap is provided with a position limiting notch, the position limiting column is fitted in the position limiting notch to mount the cover cap to the mounting support, and the first end of the spiral spring is fitted over the position limiting column.

8. The vehicle as set forth in claim 7, wherein an outer circumferential surface of the connecting dish is provided with a slot and the second end of the spiral spring is inserted in and fitted in the slot.

9. The vehicle as set forth in claim 8, wherein the electric motor casing includes a mounting hole, the position limiting column passes through the mounting hole, the position limiting column defines a threaded hole therein, and the electric motor is mounted to the mounting support through a bolt fitted in the threaded hole.

\* \* \* \* \*